US012080170B2

(12) United States Patent
Avedisov et al.

(10) Patent No.: US 12,080,170 B2
(45) Date of Patent: Sep. 3, 2024

(54) SYSTEMS AND METHODS FOR MANAGING COOPERATIVE MANEUVERING AMONG CONNECTED VEHICLES

(71) Applicant: Toyota Motor Engineering & Manufacturing North America, Inc., Plano, TX (US)

(72) Inventors: Sergei S. Avedisov, Mountain View, CA (US); Yashar Zeiynali Farid, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 247 days.

(21) Appl. No.: 17/736,686

(22) Filed: May 4, 2022

(65) Prior Publication Data

US 2023/0360534 A1 Nov. 9, 2023

(51) Int. Cl.

| | |
|---|---|
| ***G08G 1/16*** | (2006.01) |
| ***G08G 1/01*** | (2006.01) |
| ***G08G 1/052*** | (2006.01) |

(52) U.S. Cl.

CPC .......... *G08G 1/167* (2013.01); *G08G 1/0133* (2013.01); *G08G 1/0141* (2013.01); *G08G 1/0145* (2013.01); *G08G 1/052* (2013.01); *G08G 1/162* (2013.01); *G08G 1/166* (2013.01)

(58) Field of Classification Search

CPC .... G08G 1/167; G08G 1/0133; G08G 1/0141; G08G 1/0145; G08G 1/052; G08G 1/162; G08G 1/166; G08G 1/0112

See application file for complete search history.

(56) References Cited

U.S. PATENT DOCUMENTS

| | | | |
|---|---|---|---|
| 9,257,046 | B2 | 2/2016 | Fuehrer |
| 9,940,840 | B1 | 4/2018 | Schubert et al. |
| 10,386,855 | B2 | 8/2019 | Lehmann et al. |
| 10,636,297 | B2 | 4/2020 | Wang et al. |
| 10,710,581 | B2 | 7/2020 | Düring et al. |

(Continued)

OTHER PUBLICATIONS

A. Correa, et al., "Infrastructure Support for Cooperative Maneuvers in Connected and Automated Driving," 2019 IEEE Intelligent Vehicles Symposium (IV), 2019, pp. 20-25.

(Continued)

*Primary Examiner* — Michael V Kerrigan
(74) *Attorney, Agent, or Firm* — Dinsmore & Shohl LLP

(57) ABSTRACT

A method for determining a cooperative maneuver for an ego vehicle is provided. The method includes determining a maneuver of the ego vehicle based on traffic information in a target lane, selecting one or more cooperative vehicles to be involved in the maneuver, determining whether the maneuver of the ego vehicle and actions of the one or more cooperative vehicles trigger congestion in the target lane based on simulation of the maneuver and the actions, instructing the ego vehicle to perform the maneuver in response to determining that the maneuver of the ego vehicle and actions of the one or more cooperative vehicles do not trigger congestion, and adjusting a number of cooperative vehicles to be involved in the maneuver in response to determining that the maneuver of the ego vehicle and actions of the one or more cooperative vehicles trigger congestion.

17 Claims, 12 Drawing Sheets

(56) References Cited

U.S. PATENT DOCUMENTS

| | | | |
|---|---|---|---|
| 10,788,845 B2 | 9/2020 | Sujan et al. | |
| 2020/0050214 A1 | 2/2020 | Goehl et al. | |
| 2020/0094819 A1 | 3/2020 | Dolgov et al. | |
| 2021/0146922 A1* | 5/2021 | Fuchs .............. | G08G 1/096791 |
| 2021/0326703 A1 | 10/2021 | Zimmer et al. | |

OTHER PUBLICATIONS

B. Lehmann, et al., "A Generic Approach towards Maneuver Coordination for Automated Vehicles," 2018 21st International Conference on Intelligent Transportation Systems (ITSC), 2018, pp. 3333-3339.

* cited by examiner

SYSTEMS AND METHODS FOR MANAGING COOPERATIVE MANEUVERING AMONG CONNECTED VEHICLES

TECHNICAL FIELD

The present disclosure relates to systems and methods for managing cooperative maneuvering among connected vehicles.

BACKGROUND

Agreement seeking cooperation allows connected automated vehicles to perform complex maneuvers such as lane changes and merges in a way where all the participants of the cooperation can perform their roles in the maneuver simultaneously. For example, as a connected automated ego vehicle is merging onto a main road, connected vehicles in the main road may make space for the ego vehicle as the ego vehicle is moving into the main road by means of following trajectories that these vehicles coordinated and negotiated prior to performing the maneuver. This kind of cooperation is much more efficient than one where automated vehicles have to use their sensors or status information sharing, e.g., basic safety messages (BSMs), as vehicles follow predefined maneuvers without feedback and improvisation.

Agreement seeking cooperation is being standardized by SAE (Maneuver Sharing Coordination Service) and ETSI (Maneuver Coordination Service), however details such as the number of vehicles involved in the maneuver negotiation, and specifics of the maneuver are out of the scope of these standards. These aspects, however, are important when designing the cooperative maneuvers, as not careful design may lead to congestion, traffic instability, driver discomfort, and cascading of maneuvers.

Accordingly, a need exists for systems and methods that mitigate traffic congestion caused by vehicle maneuvers.

SUMMARY

The present disclosure provides systems and methods for managing cooperative maneuvering among connected vehicles.

In one embodiment, a method for determining a maneuver for an ego vehicle is provided. The method includes determining a maneuver of the ego vehicle based on traffic information in a target lane, selecting one or more cooperative vehicles to be involved in the maneuver in the target lane, determining whether the maneuver of the ego vehicle and actions of the one or more cooperative vehicles trigger congestion in the target lane based on simulation of the maneuver and the actions, instructing the ego vehicle to perform the maneuver in response to determining that the maneuver of the ego vehicle and actions of the one or more cooperative vehicles do not trigger congestion in the target lane, and adjusting a number of cooperative vehicles to be involved in the maneuver in the target lane in response to determining that the maneuver of the ego vehicle and actions of the one or more cooperative vehicles trigger congestion in the target lane.

In another embodiment, a method for determining a maneuver for an ego vehicle is provided. The method includes determining a maneuver of the ego vehicle based on traffic information in a target lane, selecting a first cooperative vehicle to be involved the maneuver in the target lane, determining whether the maneuver of the ego vehicle and an action of the first cooperative vehicle trigger congestion in the target lane based on simulation of the maneuver and the action, instructing the ego vehicle to perform the maneuver in response to determining that the maneuver of the ego vehicle and the action of the first cooperative vehicle do not trigger congestion in the target lane, and selecting a second cooperative vehicle instead of the first cooperative vehicle to be involved in the maneuver in the target lane in response to determining that the maneuver of the ego vehicle and action of the first cooperative vehicle trigger congestion in the target lane.

In another embodiment, a system includes a processor programmed to: determine a maneuver of an ego vehicle based on traffic information in a target lane, select one or more cooperative vehicles to be involved the maneuver in the target lane, determine whether the maneuver of the ego vehicle and actions of the one or more cooperative vehicles trigger congestion in the target lane based on simulation of the maneuver and the actions, instruct the ego vehicle to perform the maneuver in response to determining that the maneuver of the ego vehicle and actions of the one or more cooperative vehicles do not trigger congestion in the target lane, and adjust a number of cooperative vehicles to be involved in the maneuver in the target lane in response to determining that the maneuver of the ego vehicle and actions of the one or more cooperative vehicles trigger congestion in the target lane.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for managing cooperative maneuvering among connected vehicles.

Figure 1:
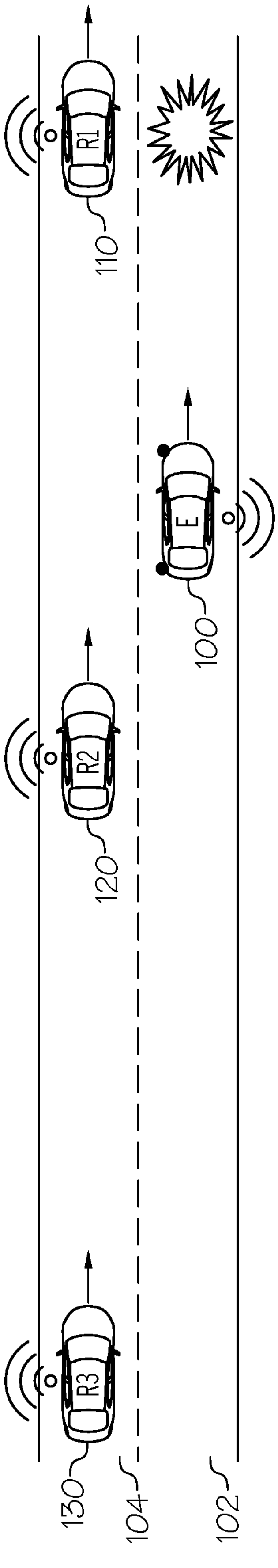
FIG. 1 schematically depicts an example scenario where an ego vehicle is about to change lanes with the help of a cooperative vehicle on a target lane, in accordance with one or more embodiments shown and described herewith.
Figure 4A:
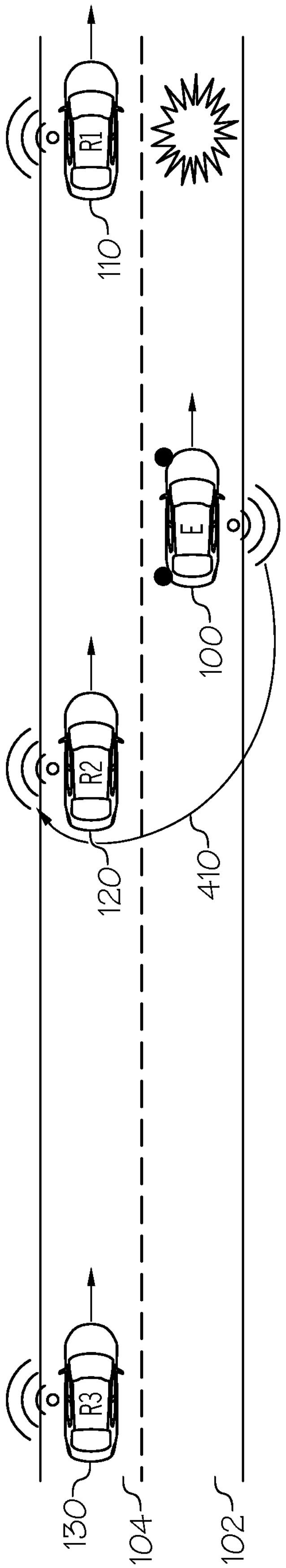
FIG. 4A depicts an ego vehicle cooperating with a connected vehicle, according to one or more embodiments shown and described herein.
Figure 4B:
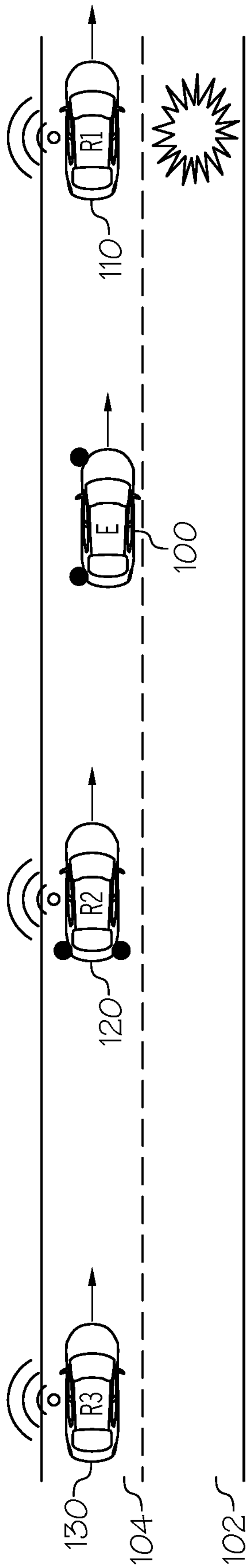
FIG. 4B depicts an ego vehicle cooperating with a connected vehicle, according to one or more embodiments shown and described herein.
Figure 5A:
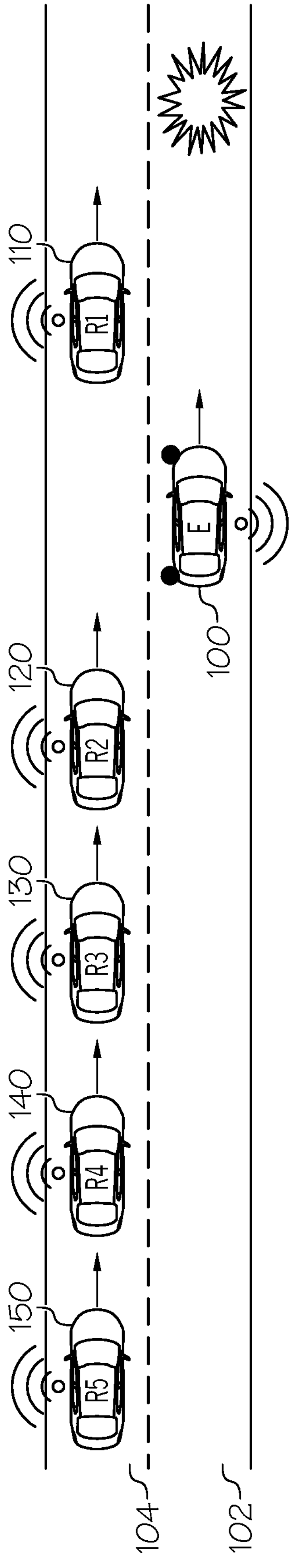
FIG. 5A depicts an ego vehicle cooperating with a connected vehicle, according to one or more embodiments shown and described herein.
Figure 5B:
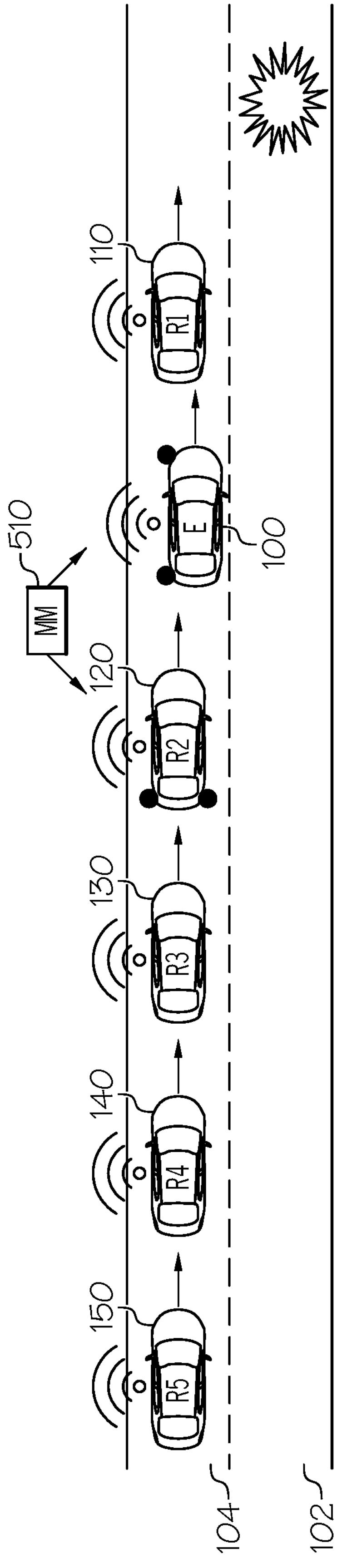
FIG. 5B depicts an ego vehicle cooperating with a connected vehicle, according to one or more embodiments shown and described herein.
Figure 5C:
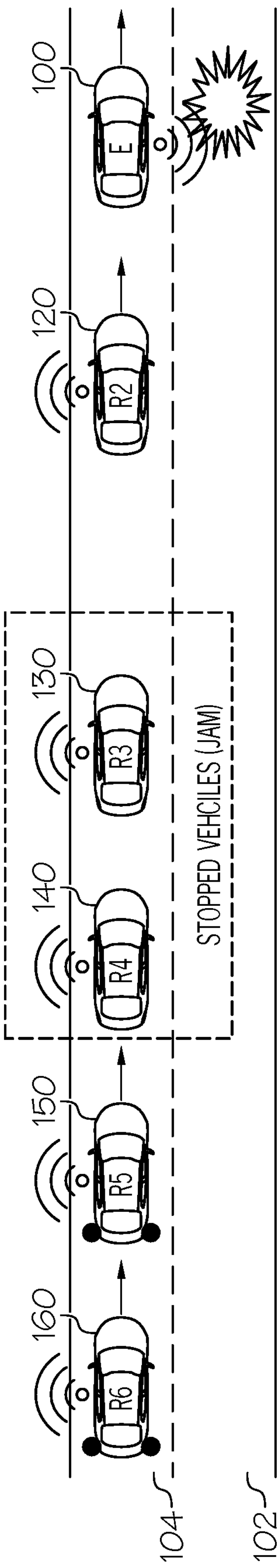
FIG. 5C depicts traffic jam caused by a maneuver of an ego vehicle, according to one or more embodiments shown and described herein.
Figure 6A:
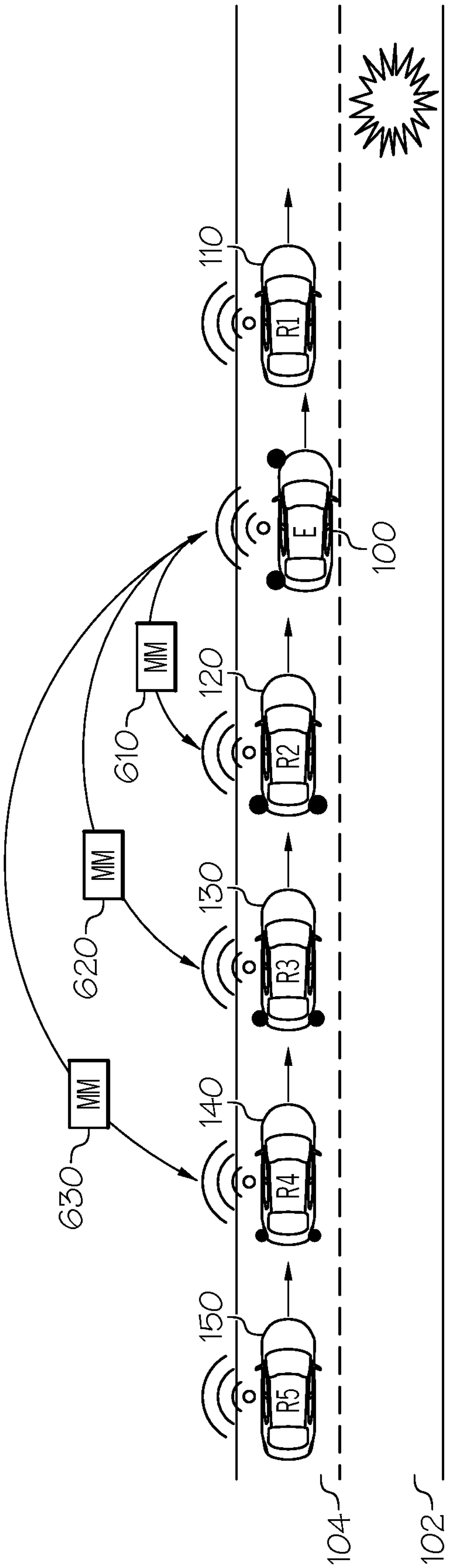
FIG. 6A depicts an ego vehicle cooperating with a plurality of connected vehicles, according to one or more embodiments shown and described herein.
Figure 11A:
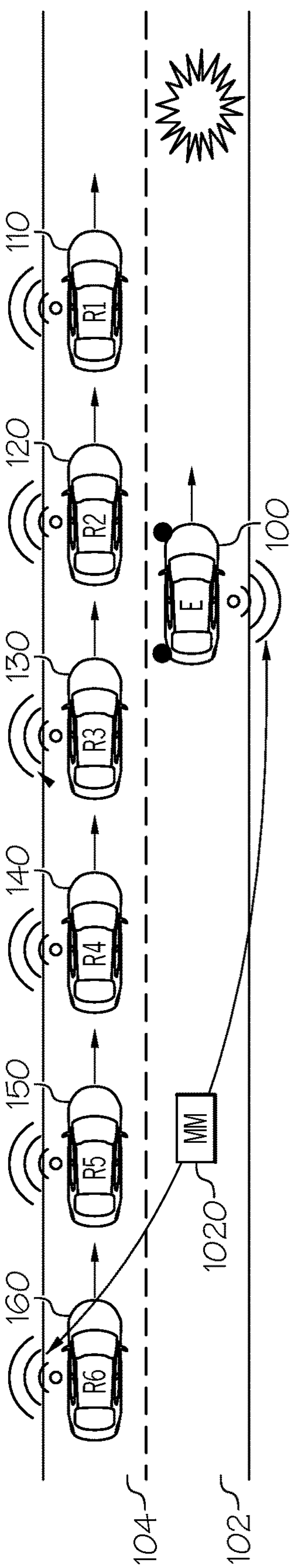
FIG. 11A depicts an ego vehicle cooperating with another connected vehicle, according to one or more embodiments shown and described herein.

In embodiments, a method for determining which connected vehicles need to be involved in helping the maneuver of an ego vehicle. The ego vehicle first determines a maneuver of the ego vehicle, e.g., changing lanes, based on traffic information on a target lane. The ego vehicle selects one or more cooperative vehicles as cooperative vehicles to be involved in the maneuver in the target lane. For example, as illustrated in FIG. 1, the ego vehicle 100 selects the connected vehicle 120 as a cooperative vehicle to be involved in helping the maneuver of the ego vehicle 100. Then, the ego vehicle determines whether the maneuver of the ego vehicle and actions of the one or more cooperative vehicles trigger congestion in the target lane based on simulation of the maneuver and the actions. If the maneuver of the ego vehicle and actions of the one or more cooperative vehicles do not trigger congestion in the target lane, the ego vehicle instructs the ego vehicle to perform the maneuver as illustrated in FIGS. 4A and 4B. If the maneuver of the ego vehicle and actions of the one or more cooperative vehicles trigger congestion in the target lane as illustrated in FIG. 5C, the ego vehicle may adjust the number of cooperative vehicles to be involved in the maneuver in the target lane as illustrated in FIG. 6A, or select another connected vehicle as cooperative vehicles to be involved in helping the maneuver of the ego vehicle, as illustrated in FIG. 11A.

FIG. 1 schematically depicts an example scenario where an ego vehicle is about to change lanes with the help of a cooperative vehicle on a target lane, in accordance with one or more embodiments shown and described herewith.

In FIG. 1, an ego vehicle 100 identifies an obstacle in a lane 102, and plans to change lanes from the lane 102 to a target lane 104. In the target lane 104, the connected vehicles 110, 120, and 130 are driving. Each of the ego vehicle 100 and the connected vehicles 110, 120, 130 may be a vehicle including an automobile or any other passenger or non-passenger vehicle such as, for example, a terrestrial, aquatic, and/or airborne vehicle. In some embodiments, each of the ego vehicle 100 and the connected vehicles 110, 120, 130 may be an autonomous driving vehicle.

The ego vehicle 100 may detect the presence of the connected vehicles 110, 120, 130 using sensors such as radar sensor, LIDAR sensors, cameras, or by communicating with the connected vehicles 110, 120, 130 via a vehicle-to-vehicle connection ("V2V connection"). The ego vehicle 100 may select one or more cooperative vehicles in the target lane 104 to be involved in the lane changing maneuver of the ego vehicle 100. For example, the ego vehicle 100 may select the connected vehicle 120 as a cooperative vehicle to be involved in the lane changing maneuver of the ego vehicle 100. That is, the ego vehicle 100 finds the connected vehicle 120 as a candidate vehicle that takes actions (e.g., slowing down) cooperative to the lane changing maneuver of the ego vehicle 100. Then, the ego vehicle 100 determines whether the lane changing maneuver of the ego vehicle 100 and the action of the connected vehicle 120 in advance of and/or responsive to the lane changing maneuver trigger congestion in the target lane 104 based on simulation of the lane changing maneuver and the action of the connected vehicle 120.

If the lane changing maneuver of the ego vehicle 100 and the action of the connected vehicle 120 do not trigger congestion in the target lane 104, then the ego vehicle 100 transmits a maneuver message (MM) to the connected vehicle 120 and changes lanes from the lane 102 to the target lane 104. If the lane changing maneuver of the ego vehicle 100 and the action of the connected vehicle 120 triggers congestion in the target lane 104, e.g., causing traffic jam for the vehicles following the connected vehicle 120, the ego vehicle 100 may increase the number of connected vehicles to be involved in the lane changing maneuver of the ego vehicle 100. For example, instead of only the connected vehicle 120 being involved, the connected vehicles 120 and 130 may be involved in the lane changing maneuver of the ego vehicle 100. For example, the connected vehicle 120 decelerates at a certain amount in expectation of the lane changing maneuver of the ego vehicle 100 and the connected vehicle 130 also decelerates in expectation of the lane changing maneuver of the ego vehicle 100 and the deceleration of the connected vehicle 120. In this case, the deceleration of the connected vehicle 130 may be less than the deceleration of the connected vehicle 120, such that a vehicle following the connected vehicle 130 may not need to decelerate or may decelerate to a lesser degree than the connected vehicle 130.

Whether the lane changing maneuver of the ego vehicle 100 and the action of the connected vehicle 120 trigger congestion in the target lane 104 may be determined based on various factors. For example, the ego vehicle 100 may predict the speed or acceleration profile oscillations of the connected vehicles 120 and 130 affected by the lane changing maneuver of the ego vehicle 100. Then, the ego vehicle 100 may determine whether the lane changing maneuver of the ego vehicle 100 and the action of the connected vehicle 120 trigger congestion in the target lane 104 based on the predicted speed or acceleration profile oscillations of the connected vehicles 120 and 130. In embodiments, the ego vehicle 100 may obtain car following models of the connected vehicles 120 and 130, and predict speed or acceleration profile oscillations of the connected vehicles 120 and 130 based on the car following models.

Figure 2:
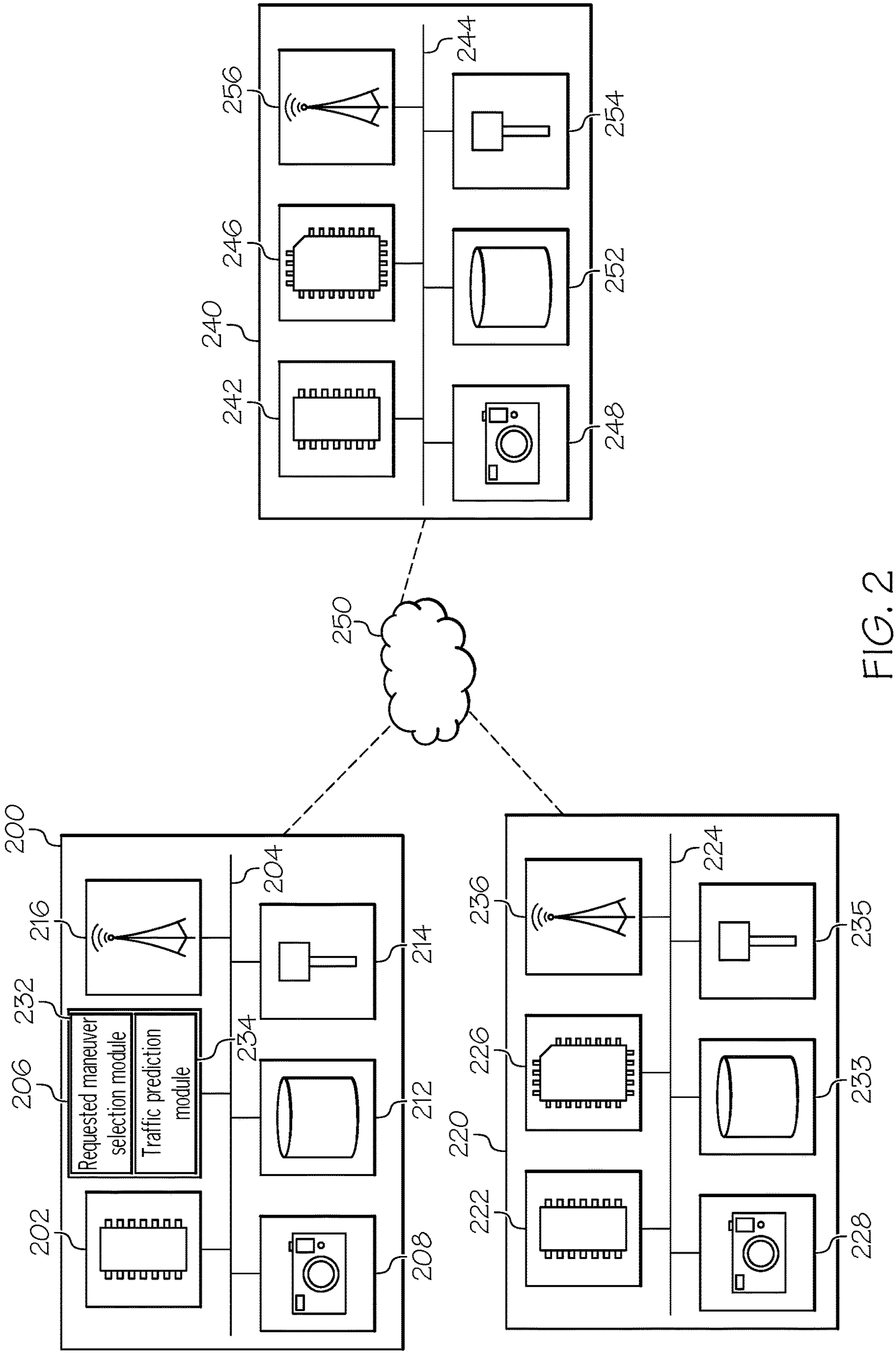
FIG. 2 depicts a schematic diagram of a maneuver cooperator selection system, according to one or more embodiments shown and described herein.

FIG. 2 depicts a schematic diagram of a maneuver cooperator selection system, according to one or more embodiments shown and described herein. The system includes an ego vehicle system 200, a connected vehicle system 220, and a connected vehicle system 240.

It is noted that, while the ego vehicle system 200, the connected vehicle system 220, and the connected vehicle system 240 are depicted in isolation, each of the ego vehicle system 200, the connected vehicle system 220, and the connected vehicle system 240 may be included within a vehicle in some embodiments, for example, respectively within each of the ego vehicle 100, and the connected vehicles 120 and 130 of FIG. 1. While FIG. 2 depicts that the ego vehicle system 200 communicates with two connected vehicle systems 220 and 240, the ego vehicle system 200 may communicate with less than or more than two connected vehicle systems. In embodiments, each of the ego vehicle system 200 and the connected vehicle systems 220 and 240 may be included within a vehicle that may be an automobile or any other passenger or non-passenger vehicle such as, for example, a terrestrial, aquatic, and/or airborne vehicle. In some embodiments, the vehicle may be an autonomous vehicle that navigates its environment with limited human input or without human input.

The ego vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processors 202 along with the one or more memory modules 206 may operate as a controller for the ego vehicle system 200.

The one or more memory modules 206 includes a requested maneuver selection module 232 and a traffic prediction module 234. The requested maneuver selection module 232 and the traffic prediction module 234 work together to select ideal maneuver cooperators, for example, connected vehicles 120 and 130 in FIG. 1, and the ideal trajectories of the maneuver cooperators. Each of the requested maneuver selection module 232 and the traffic prediction module 234 may be a program module in the form of operating systems, application program modules, and other program modules stored in one or more memory modules 206. In some embodiments, the program module may be stored in a remote storage device that may communicate with the ego vehicle system 200, for example, in a cloud server or an edge server. Such a program module may include, but is not limited to, routines, subroutines, programs, objects, components, data structures, and the like for performing specific tasks or executing specific data types as will be described below.

In embodiments, the requested maneuver selection module 232 determines requested maneuvers of cooperative vehicles and corresponding trajectory sets of the cooperative vehicles and transmits the requested maneuvers of cooperative vehicles and corresponding trajectory sets of the cooperative vehicles. The traffic prediction module 234 predict whether congestion and/or traffic jam will occur in a target lane based on the simulation of the requested maneuver and the corresponding trajectory sets and traffic information in the target lane, such as traffic density. For example, the traffic prediction module 234 may determine key performance indicators, e.g., driving challenge of cooperative vehicles, traffic flow, driver comfort, and timeliness of the maneuver, caused by the cooperative maneuver in the future by running simulations of the maneuver of the ego vehicle and the actions of the cooperative vehicles. The simulation may use IDM (intelligent driving model) for upstream vehicles. Alternatively a trained artificial intelligence model may consider the traffic density, dynamics of surrounding vehicles into account and determine how many vehicles will cooperate in the maneuver together with the ego vehicle. In addition, this model may consider the trajectories that the ego vehicle and cooperative vehicles will take. Having an AI trained model or a lookup table trained on previous data in advance would allow for quick determination of which vehicle can cooperate with which vehicle, which may be critical in a dynamic task. Then, the traffic prediction module 234 may predict whether congestion and/or traffic jam will occur in a target lane based on the key performance indicators. The traffic prediction module 234 may transmit the key performance indicators for the requested maneuver to the requested maneuver selection module 232. The requested maneuver selection module 232 may maintain or update the requested maneuver based on the key performance indicators.

Referring still to FIG. 2, the ego vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the presence of other vehicles such as the connected vehicles 110, 120, 130 in FIG. 1, and/or the distance between the ego vehicle 100 and the connected vehicles 110, 120, 130. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the ego vehicle 100.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar sensors may be used to obtain a rough depth and speed information for the view of the ego vehicle system 200.

The ego vehicle system 200 comprises a satellite antenna 214 coupled to the communication path 204 such that the communication path 204 communicatively couples the satellite antenna 214 to other modules of the ego vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The ego vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the ego vehicle 100. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the ego vehicle system 200 comprises network interface hardware 216 for communicatively coupling the ego vehicle system 200 to the connected vehicle systems 220 and 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the ego vehicle system 200 may transmit its data to the connected vehicle system 220 or 240. For example, the network interface hardware 216 of the ego vehicle system 200 may transmit vehicle data, location data, maneuver data and the like to other connected vehicles, a cloud server, edge servers, and the like.

The ego vehicle system 200 may connect with one or more external vehicle systems (e.g., the connected vehicle systems 220 and 240) and/or external processing devices (e.g., a cloud server, or an edge server) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The ego vehicle system 200 may communicate with external communicate vehicle systems using wireless messages such as basic safety messages (BSMs), maneuver massages (MMs), and the like. BSM is a wireless message transmitted between vehicles where the transmitter sends its position, speed and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the ego vehicle system 200 may be communicatively coupled to the connected vehicles systems 220 and 240 or a cloud server by the network 250. In one embodiment, the network 250 may include one or more computer networks (e.g., a personal area network, a local area network, or a wide area network), cellular networks, satellite networks and/or a global positioning system and combinations thereof. Accordingly, the ego vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the connected vehicle system 220 includes one or more processors 222, one or more memory modules 226, one or more sensors 228, one or more vehicle sensors 233, a satellite antenna 235, and a communication path 224 communicatively connected to the other components of the connected vehicle system 220. The components of the connected vehicle system 220 may be structurally similar to and have similar functions as the corresponding components of the ego vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 233 corresponds to the one or more vehicle sensors 212, the satellite antenna 235 corresponds to the satellite antenna 214, the communication path 224 corresponds to the communication path 204, and the network interface hardware 236 corresponds to the network interface hardware 216). The one or more memory modules 226 may store a requested maneuver selection module and a traffic prediction module similar to the requested maneuver selection module 232 and the traffic prediction module 234 of the ego vehicle system 200.

Similarly, the connected vehicle system 240 includes one or more processors 242, one or more memory modules 246, one or more sensors 248, one or more vehicle sensors 252, a satellite antenna 254, and a communication path 244 communicatively connected to the other components of the connected vehicle system 240. The components of the connected vehicle system 240 may be structurally similar to and have similar functions as the corresponding components of the ego vehicle system 200 (e.g., the one or more processors 242 corresponds to the one or more processors 202, the one or more memory modules 246 corresponds to the one or more memory modules 206, the one or more sensors 248 corresponds to the one or more sensors 208, the one or more vehicle sensors 252 corresponds to the one or more vehicle sensors 212, the satellite antenna 254 corresponds to the satellite antenna 214, the communication path 244 corresponds to the communication path 204, and the network interface hardware 256 corresponds to the network interface hardware 216). The one or more memory modules 246 may store a requested maneuver selection module and a traffic prediction module similar to the requested maneuver selection module 232 and the traffic prediction module 234 of the ego vehicle system 200.

Figure 3:
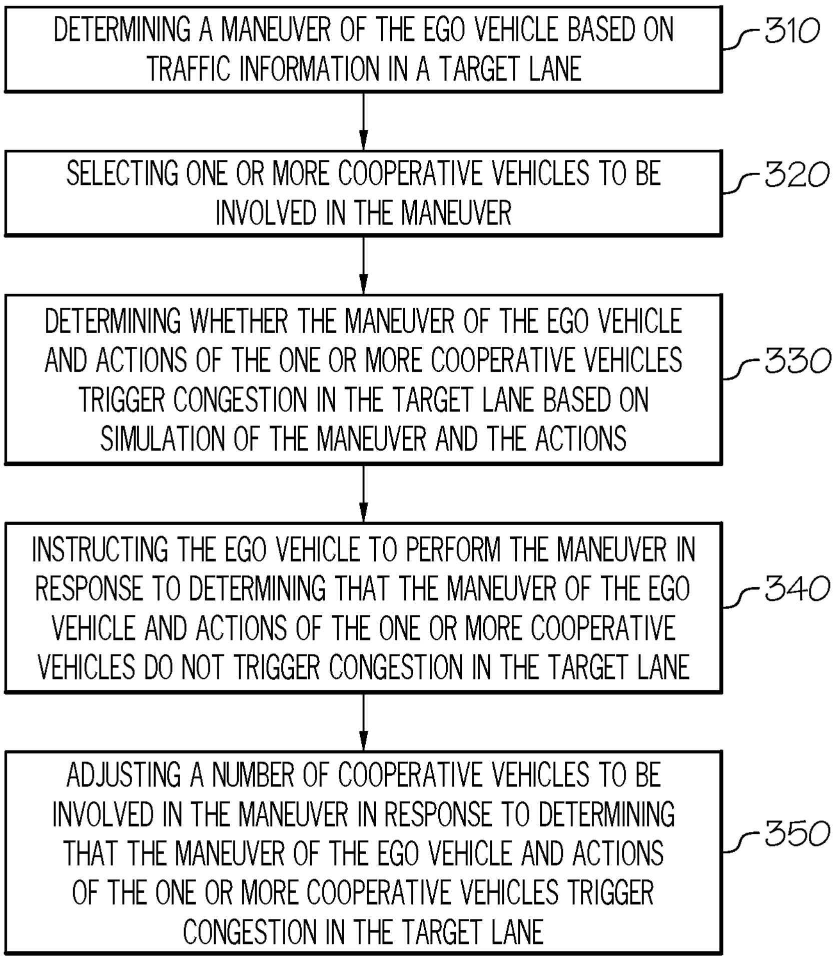
FIG. 3 depicts a flowchart for selecting cooperative vehicles to be involved in the maneuver of an ego vehicle, according to one or more embodiments shown and described herein.

FIG. 3 depicts a flowchart for selecting cooperative vehicles to be involved in the maneuver of an ego vehicle, according to one or more embodiments shown and described herein. The flowchart is described with reference to FIGS. 1 and 2 of the present application.

In step 310, a controller of an ego vehicle determines a maneuver of the ego vehicle based on traffic information in a target lane. For example, by referring to FIG. 1, the ego vehicle 100 determines the lane changing or merging maneuver of the ego vehicle 100 based on traffic information in the target lane 104. The maneuver may be any other maneuver including, but not limited to, a U-turn maneuver, a left turn or right-turn maneuver, and the like. The traffic information may include the presence and speed of connected or unconnected vehicles in the target lane 104, the traffic density of vehicles in the target lane 104, and the like. The presence and speed of connected or unconnected vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104.

In step 320, the controller of the ego vehicle selects one or more cooperative vehicles to be involved in the maneuver. For example, by referring to FIG. 1, the ego vehicle 100 selects the connected vehicle 120 to be involved in the lane changing maneuver in the target lane 104. That is, the ego vehicle 100 expects the connected vehicle 120 to cooperate the lane changing maneuver of the ego vehicle 100, by e.g., slowing down to make a space for the ego vehicle 100. In some embodiments, the ego vehicle 100 may select the connected vehicles 120 and 130 to be involved in the lane changing maneuver in the target lane 104. In some embodiments, the number of selected one or more cooperative vehicles may be determined based on a degree of traffic density in the target lane, which will be described below with reference to FIG. 8. The higher the degree of traffic density in the target lane 104, the more cooperative vehicles are selected to be involved in the lane changing maneuver of the ego vehicle 100. In some embodiments, the controller of the ego vehicle may select connected vehicles in a lane other than the target lane.

In step 330, the controller of the ego vehicle determines whether the maneuver of the ego vehicle and actions of the one or more cooperative vehicles trigger congestion in the target lane based on simulation of the maneuver and the actions. For example, by referring to FIG. 1, the ego vehicle 100 determines whether the maneuver of the ego vehicle 100 and the action of the connected vehicle 120 trigger congestion in the target lane 104 based on simulation of the maneuver and the action. For example, the traffic prediction module 234 of the ego vehicle system 200 in FIG. 2 may determine key performance indicators, e.g., driving challenge of cooperative vehicles, traffic flow, driver comfort, and timeliness of the maneuver, caused by the cooperative maneuver of the connected vehicle 120 in the future by running simulations of the ego vehicle 100 and the connected vehicle 120. The simulation may use IDM (intelligent driving model) for upstream vehicles. Based on the key performance indicators, the controller of the ego vehicle 100 may determine whether the maneuver of the ego vehicle 100 and the action of the connected vehicle 120 trigger congestion in the target lane 104.

In step 340, the controller of the ego vehicle instructs the ego vehicle to perform the maneuver in response to determining that the maneuver of the ego vehicle and actions of the one or more cooperative vehicles do not trigger congestion in the target lane. For example, by referring to FIG. 1, the ego vehicle 100 may determine that the lane changing maneuver of the ego vehicle 100 and the slowing down action of the connected vehicle 120 do not trigger congestion in the target lane 104. Specifically, the simulation of the lane changing maneuver of the ego vehicle 100 and the cooperative action of the connected vehicle 120 finds that even if the connected vehicle 120 slows down, the slowing down action of the connected vehicle 120 does not significantly affect the speed of the connected vehicle 130. That is, the connected vehicle 130 does not need to slow down in response to the slowing down action of the connected vehicle 120, or the average speed of the vehicle behind the connected vehicle 120 does not change significantly. Once the ego vehicle 100 determines that the lane changing maneuver of the ego vehicle 100 and the slowing down action of the connected vehicle 120 do not trigger congestion in the target lane, the ego vehicle 100 may initiate switching lanes from the lane 102 to the target lane 104.

The ego vehicle 100 may also transmit a maneuver message 410 to the connected vehicle 120, as illustrated in FIG. 4A. The maneuver message may include information that the ego vehicle 100 is going to change lanes from the lane 102 to the target lane 104 and the expected trajectory of the ego vehicle 100, and the maneuver to be made by the connected vehicle 120. The connected vehicle 120 may decelerate in response to receiving the maneuver message from the ego vehicle 100 to secure a space for the ego vehicle 100 in the target lane 104. The ego vehicle 100 may change lanes from the lane 102 to the target lane 104 based on the expected trajectory as illustrated in FIG. 4B. In this case, although the connected vehicle 120 decelerates, the connected vehicle 130 may not need to decelerate or need to decelerate marginally such that vehicles behind the connected vehicle 130 does not need to decelerate in response to the lane changing maneuver of the ego vehicle 100. For example, the connected vehicle 130 may not need to decelerate or need to decelerate marginally because there is enough space between the connected vehicle 120 and the connected vehicle 130 and/or the degree of deceleration of the connected vehicle 120 is insignificant.

In step 350, the controller of the ego vehicle adjusts the number of cooperative vehicles to be involved in the maneuver in response to determining that the maneuver of the ego vehicle and actions of the one or more cooperative vehicles trigger congestion in the target lane. In embodiments, FIGS. 5A-5C depict a simulation where the maneuver of the ego vehicle 100 and the action of one cooperative vehicle, i.e., the connected vehicle 120, trigger congestion in the target lane 104. Specifically, by referring to FIG. 5A, the ego vehicle 100 in the lane 102 is trying to change lanes from the lane 102 to the target lane 104. Connected vehicles 110, 120, 130, 140, 150 are driving in the target lane 104. In this example, the target lane 104 has denser and faster moving traffic than the target lane 104 in FIG. 1.

In FIG. 5B, the simulation shows that the ego vehicle 100 communicates with the connected vehicle 120 regarding the lane changing maneuver. The ego vehicle 100 transmits a maneuver message 510 that includes information that the ego vehicle 100 is going to change lanes from the lane 102 to the target lane 104 and the expected trajectory of the ego vehicle 100, and the maneuver to be made by the connected vehicle 120. In this simulation, the connected vehicle 120 needs to brake hard or decelerate significantly to cooperate with the lane changing maneuver of the ego vehicle 100. The sudden brake of the connected vehicle 120 causes the connected vehicles 130 and 140 to stop, which forms a traffic jam, as illustrated in FIG. 5C. The following connected vehicles 150 and 160 also need to stop.

Figure 7:
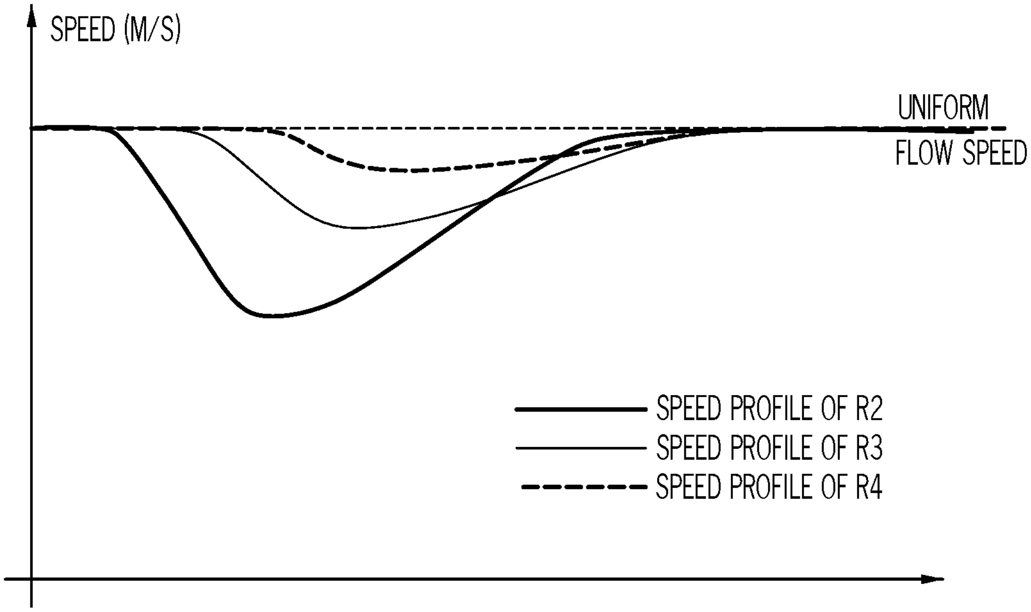
FIG. 7 depicts a graph for the speed profiles of the plurality of vehicles in FIGS. 6A and 6B.

Because the simulation shows that the maneuver of the ego vehicle 100 and the cooperative action of the connected vehicle 120 trigger congestion in the target lane 104, the ego vehicle 100 may need to adjust the number of cooperative vehicles to be involved in the maneuver of the ego vehicle 100 in the target lane 104. The ego vehicle 100 may increase the number of cooperative vehicles to be involved in the maneuver in the target lane 104. For example, the ego vehicle 100 may select the connected vehicles 120, 130, 140 as cooperative vehicles that are to be involved in the lane changing maneuver of the ego vehicle 100. Based on the selection of the connected vehicles 120, 130, 140, the ego vehicle 100 again performs simulation of the lane changing maneuver of the ego vehicle 100 and the cooperative actions of the connected vehicles 120, 130, 140 as illustrated in FIG. 6A. Specifically, in the simulation shown in FIG. 6A, the ego vehicle 100 transmits maneuver messages 610, 620, 630 to the connected vehicles 120, 130, 140, respectively. Each of the maneuver messages 610, 620, 630 may include information that the ego vehicle 100 is going to change lanes from the lane 102 to the target lane 104 and the expected trajectory of the ego vehicle 100, and the maneuver to be made by each of the connected vehicles 120, 130, 140. The connected vehicle 120 may take a cooperative action, for example, a braking action to cooperate with the lane changing maneuver of the ego vehicle 100. In embodiments, the connected vehicle 120 may decelerate based on a speed profile included in the maneuver message 610. Similarly, the connected vehicle 130 may decelerate based on a speed profile included in the maneuver message 620, and the connected vehicle 140 may decelerate based on a speed profile included in the maneuver message 630. FIG. 7 illustrates a graph for the speed profiles of the connected vehicles 120, 130, 140 that do not trigger traffic jam in the target lane 104 even when the ego vehicle 100 changes lanes from the lane 102 to the target lane 104. The speed profiles of the connected vehicles 120, 130, 140 satisfy string stability properties, and prevent traffic congestion from forming after the connected vehicle 140.

Figure 6B:
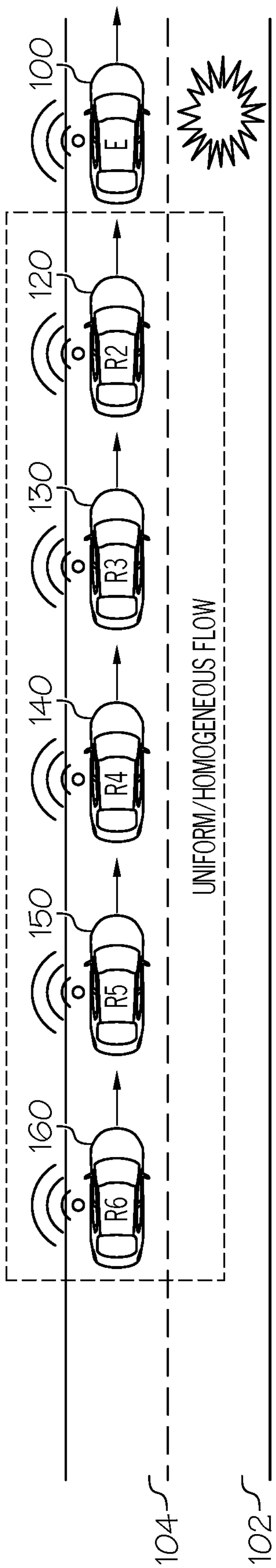
FIG. 6B depicts an ego vehicle cooperating with a plurality of connected vehicles, according to one or more embodiments shown and described herein.

The simulation of the lane changing maneuver of the ego vehicle 100 and the cooperative actions of the connected vehicles 120, 130, 140 shows a uniform or homogeneous flow in the target lane 104 as illustrated in FIG. 6B. Once it is determined that the simulation of the lane changing maneuver of the ego vehicle 100 and the cooperative actions of the connected vehicles 120, 130, 140 does not trigger traffic jam in the target lane 104, the ego vehicle 100 actually transmits the maneuver messages 610, 620, 630 to the connected vehicles 120, 130, 140, respectively, and changes lanes from the lane 102 to the target lane 104.

In some embodiments, the ego vehicle 100 may determine a minimum number of connected vehicles required to avoid triggering congestion in the target lane 104 in response to determining that the maneuver of the ego vehicle 100 and actions of the one or more cooperative vehicles do not trigger congestion in the target lane 104. Then, the ego vehicle 100 may reduce the number of cooperative vehicles to be involved in the maneuver to the minimum number of connected vehicles. For example, the ego vehicle 100 may determining that the maneuver of the ego vehicle 100 and actions of the connected vehicles 120, 130, 140 do not trigger congestion in the target lane 104 based on the simulation of the maneuver of the ego vehicle 100 and the actions of the connected vehicles 120, 130, 140. Then, the ego vehicle 100 may determine that the maneuver of the ego vehicle 100 and actions of two connected vehicles, i.e., the connected vehicles 120, 130 still do not trigger congestion in the target lane 104 based on the simulation of the maneuver of the ego vehicle 100 and the actions of the connected vehicles 120, 130. However, the ego vehicle 100 may determine that the maneuver of the ego vehicle 100 and the action of one connected vehicle, i.e., the connected vehicle 120 trigger congestion in the target lane 104 based on the simulation of the maneuver of the ego vehicle 100 and the action of the connected vehicle 120. Based on the simulations, the ego vehicle 100 may determine that the minimum number of connected vehicles required to avoid triggering congestion in the target lane 104 is two. Then, the ego vehicle 100 may reduce the number of cooperative vehicles to be involved in the maneuver to two, i.e., connected vehicles 120 and 130. This process of optimizing the number of connected vehicles to be involved in the maneuver of the ego vehicle 100 reduces the amount of data to be communicated between the ego vehicle and connected vehicles while the ego vehicle 100 is changing lanes with the cooperation of the connected vehicles.

Figure 8:
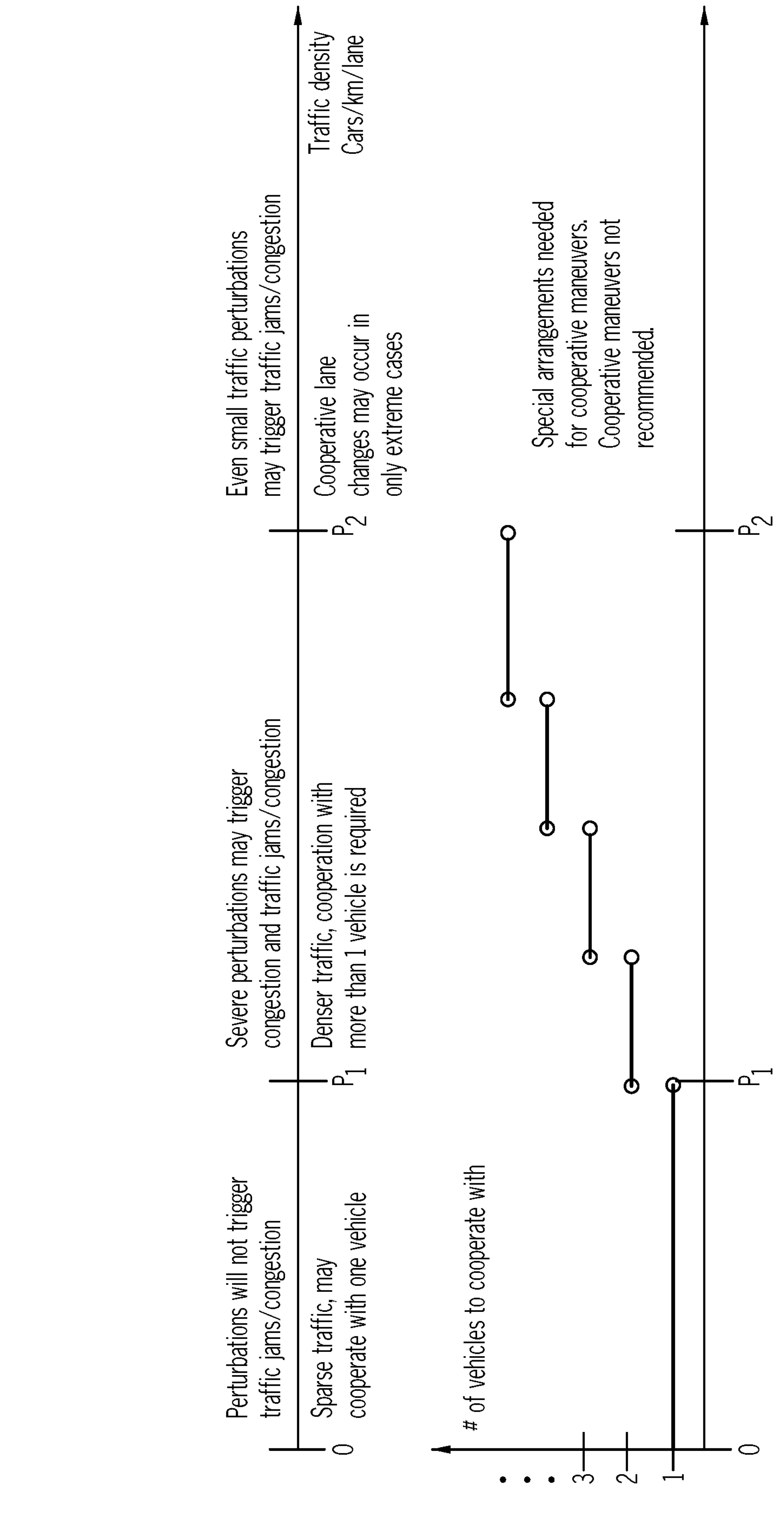
FIG. 8 depicts a graph for determining how many vehicles should be involved in the cooperative lane change.

FIG. 8 depicts a graph for determining how many vehicles should be involved in the cooperative lane change. When the traffic density is between 0 and $P_1$, perturbations would not trigger traffic jams or congestions. The ego vehicle may need to cooperative with only one connected vehicle when the traffic density is between 0 and $P_1$. $P_1$ is a first critical vehicle density, at which perturbations to traffic may trigger a jam or propagate congestion. When the traffic density is between $P_1$ and $P_2$, the ego vehicle needs to cooperate with more than one connected vehicle. $P_2$ is a second critical density at which even the smallest perturbations would trigger a congestion. If the traffic density is greater than $P_2$, cooperative maneuvers are not recommended.

Figure 9:
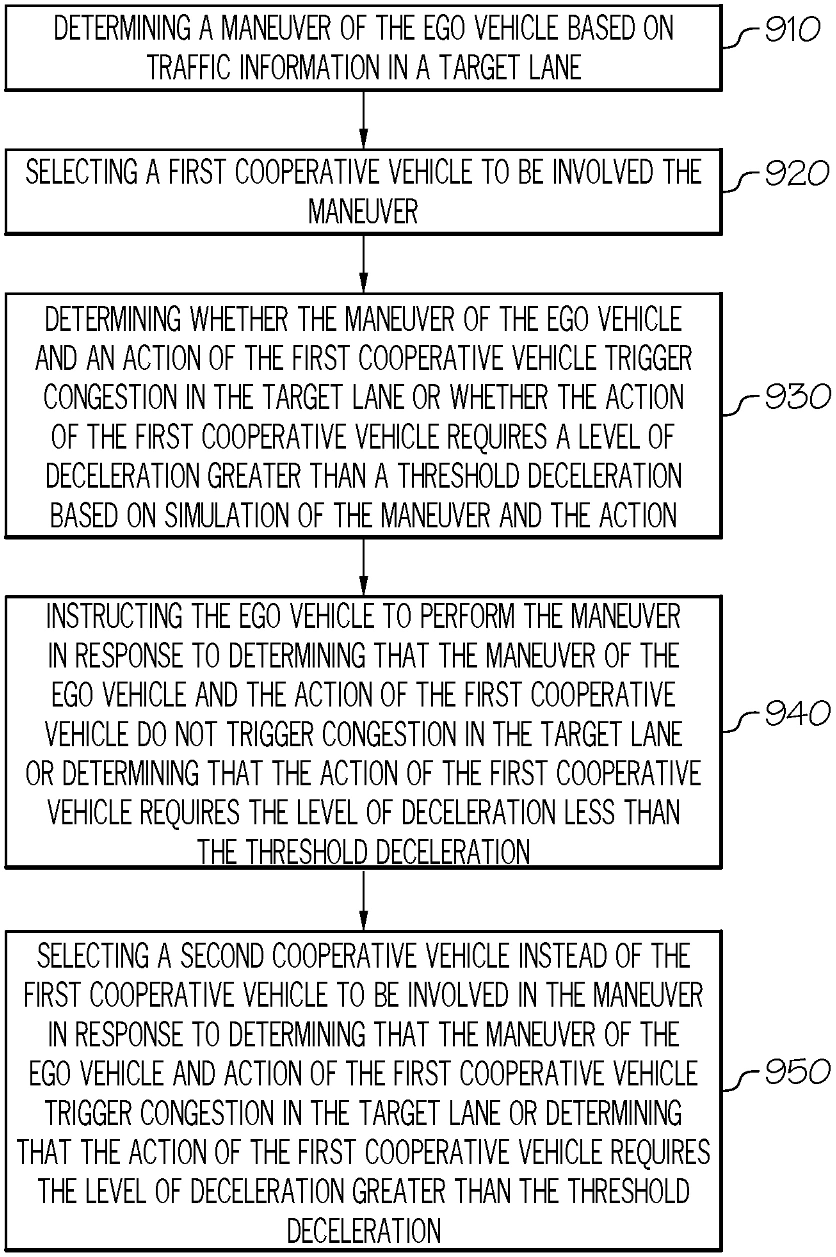
FIG. 9 depicts a flowchart for selecting cooperative vehicles to be involved in a maneuver of an ego vehicle, according to another embodiment shown and described herein.

FIG. 9 depicts a flowchart for selecting cooperative vehicles to be involved in a maneuver of an ego vehicle, according to another embodiment shown and described herein. The flowchart is described with reference to FIGS. 1 and 2 of the present application.

In step 910, the controller of the ego vehicle determines a maneuver of the ego vehicle based on traffic information in a target lane. For example, by referring to FIG. 10A, the ego vehicle 100 determines the lane changing or merging maneuver of the ego vehicle 100 based on traffic information in the target lane 104. The maneuver may be any other maneuver including, but not limited to, a U-turn maneuver, a left turn or right-turn maneuver, and the like. The traffic information may include the presence and speed of connected or unconnected vehicles in the target lane 104, the traffic density of vehicles in the target lane 104, and the like. The presence and speed of connected or unconnected vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104.

In step 920, the controller of the ego vehicle selects a first cooperative vehicle to be involved the maneuver in the target lane. For example, by referring to FIG. 10A, the ego vehicle 100 may select the connected vehicle 130 to be involved in the lane changing maneuver of the ego vehicle 100.

In step 930, the controller of the ego vehicle determines whether the maneuver of the ego vehicle and the action of the first cooperative vehicle trigger congestion in the target lane or whether the action of the first cooperative vehicle requires a level of deceleration greater than a threshold deceleration based on simulation of the maneuver and the action. For example, by referring to FIG. 10A, the ego vehicle 100 determines whether the maneuver of the ego vehicle 100 and the action of the connected vehicle 130 trigger congestion in the target lane 104 based on simulation of the lane changing maneuver and the cooperative action of the connected vehicle 130. For example, the traffic prediction module 234 of the ego vehicle system 200 in FIG. 2 may determine key performance indicators, e.g., driving challenge of cooperative vehicles, traffic flow, driver comfort, and timeliness of the maneuver, caused by the cooperative maneuver of the connected vehicle 120 in the future by running simulations of the ego vehicle 100 and the connected vehicle 130. The simulation may use IDM (intelligent driving model) for upstream vehicles. Based on the key performance indicators, the controller of the ego vehicle 100 may determine whether the maneuver of the ego vehicle 100 and the action of the connected vehicle 130 trigger congestion in the target lane 104. As another example, the controller of the ego vehicle 100 determines whether the action of the connected vehicle 130 requires a level of deceleration greater than a threshold deceleration in order to provide a space for the ego vehicle 100 to change lanes from the lane 102 to the target lane 104. The threshold deceleration may be a deceleration preset by the system or by the driver of the connected vehicle 130. In some embodiments, the threshold deceleration may be determined based on the type of a cooperative vehicle.

In step 940, the controller of the ego vehicle instructs the ego vehicle to perform the maneuver in response to determining that the maneuver of the ego vehicle and the action of the first cooperative vehicle do not trigger congestion in the target lane or determining that the action of the first cooperative vehicle requires a level of deceleration less than a threshold deceleration.

For example, the ego vehicle 100 may determine that the lane changing maneuver of the ego vehicle 100 and the slowing down action of the connected vehicle 130 do not trigger congestion in the target lane 104 or determine that the action of the connected vehicle 130 requires a level of deceleration less than the threshold deceleration based on the simulation of the lane changing maneuver and the slowing down action. Once the ego vehicle 100 may determine that the lane changing maneuver of the ego vehicle 100 and the slowing down action of the connected vehicle 130 do not trigger congestion in the target lane 104 or determine that the action of the connected vehicle 130 requires a level of deceleration less than the threshold deceleration, the ego vehicle 100 may transmit a maneuver message 1010 to the connected vehicle 130 and initiate switching lanes from the lane 102 to the target lane 104.

In step 950, the controller of the ego vehicle selects a second cooperative vehicle instead of the first cooperative vehicle to be involved in the maneuver in the target lane in response to determining that the maneuver of the ego vehicle and action of the first cooperative vehicle trigger congestion in the target lane or determining that the action of the first cooperative vehicle requires a level of deceleration greater than the threshold deceleration.

Figure 10A:
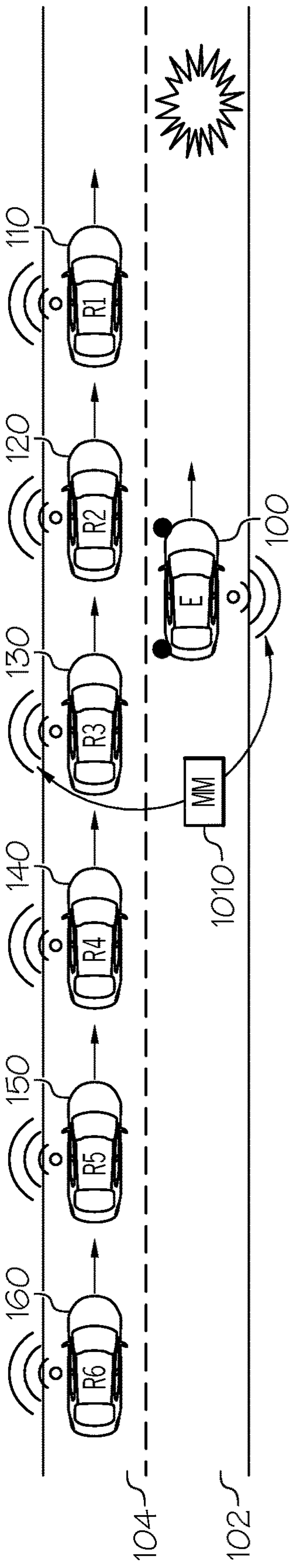
FIG. 10A depicts an ego vehicle cooperating with a connected vehicle, according to one or more embodiments shown and described herein.

Specially, by referring to FIG. 10A, in the simulation, the ego vehicle 100 transmits a maneuver message 1010 that includes information that the ego vehicle 100 is going to change lanes from the lane 102 to the target lane 104 and the expected trajectory of the ego vehicle 100, and the maneuver to be made by the connected vehicle 130. In the simulation, the connected vehicle 130 brakes hard, and the connected vehicles 140 and 150 also brake hard in response to the brake of the connected vehicle 130, as illustrated in FIG.

10B. Because the connected vehicle 130 needs to brake hard, i.e., the level of deceleration of the connected vehicle 130 is greater than the threshold deceleration, cooperating with the connected vehicle 130 may not be ideal. The cooperation by the connected vehicle 130 may lead to hard braking for upstream vehicles. In addition, the maneuver of the ego vehicle 100 and action of the connected vehicle 130 may trigger congestion in the target lane 104. In response, the ego vehicle 100 may select another connected vehicle that does not need to brake hard to cooperate with the ego vehicle 100, as a cooperative vehicle for the lane changing maneuver of the ego vehicle 100. For example, the ego vehicle 100 may select the connected vehicle 160 as a cooperative vehicle.

Figure 10B:
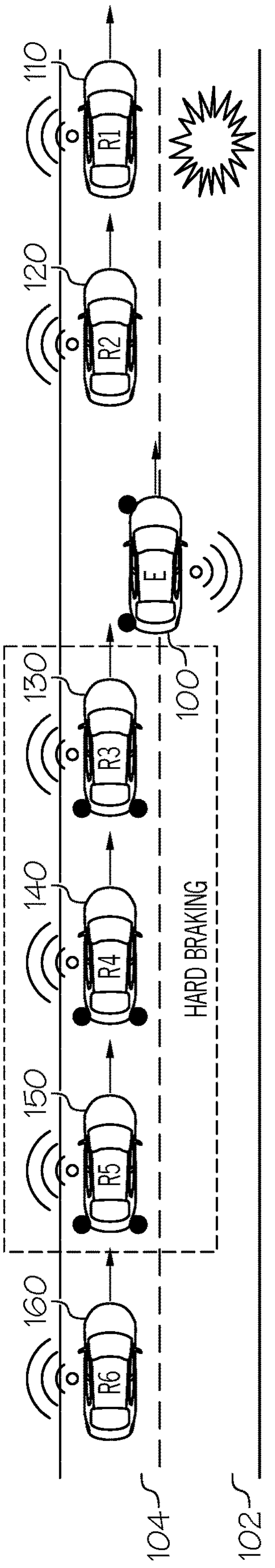
FIG. 10B depicts an ego vehicle cooperating with a connected vehicle, according to one or more embodiments shown and described herein.
Figure 11B:
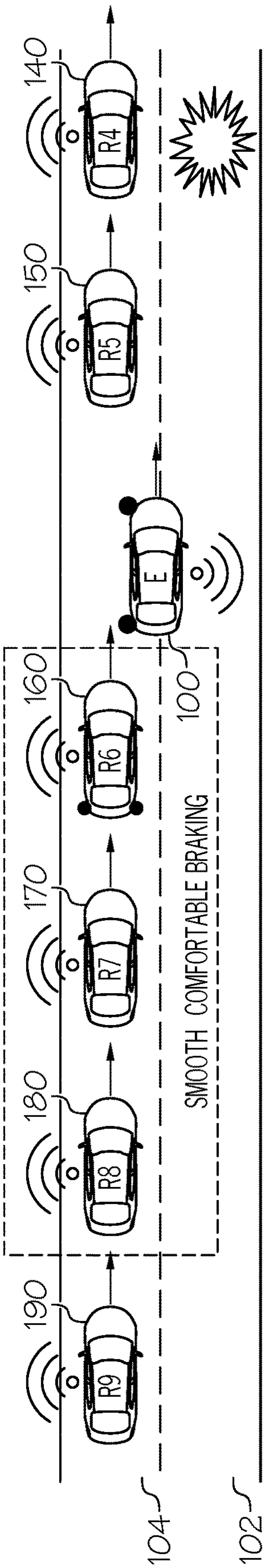
FIG. 11B depicts an ego vehicle cooperating with another connected vehicle, according to one or more embodiments shown and described herein.

Based on the selection of the connected vehicle 160, the ego vehicle 100 again performs simulation of the lane changing maneuver of the ego vehicle 100 and the cooperative action of the connected vehicle 160 as illustrated in FIG. 11A. Specifically, in the simulation shown in FIG. 11A, the ego vehicle 100 transmits a maneuver message 1020 to the connected vehicle 160. The maneuver message 1020 may include information that the ego vehicle 100 is going to change lanes from the lane 102 to the target lane 104 and the expected trajectory of the ego vehicle 100, and the maneuver to be made by the connected vehicle 160. The maneuver to be made by the connected vehicle 160 may include a requested speed profile for the connected vehicle 160. The connected vehicle 160 may take a cooperative action, for example, a braking action to cooperate with the lane changing maneuver of the ego vehicle 100 based on the requested speed profile, as illustrated in FIG. 11B. In contrast with the connected vehicle 130, the connected vehicle 160 may have more time to accommodate the lane changing maneuver of the ego vehicle 100 because the connected vehicle 160 is located farther from the ego vehicle 100 than the connected vehicle 130. In this regard, the speed profile indicates a relatively smooth deceleration of the connected vehicle 160. Thus, the drivers of the vehicles 160, 170, 180 feel relatively comfortable when perform the cooperative maneuver as opposed to the drivers of the vehicles 130, 140, 150 in FIG. 10B.

The simulation of the lane changing maneuver of the ego vehicle 100 and the cooperative actions of the connected vehicle 160 shows relatively smooth and comfortable braking of the connected vehicles 160, 170, 180 in the target lane 104 as illustrated in FIG. 11B. Once it is determined that the simulation of the lane changing maneuver of the ego vehicle 100 and the cooperative actions of the connected vehicle 160 does not trigger traffic jam in the target lane 104, the ego vehicle 100 actually transmits the maneuver message 1020 to the connected vehicle 160, and changes lanes from the lane 102 to the target lane 104.

It should be understood that embodiments described herein are directed to a method for determining a maneuver for an ego vehicle. The method includes determining a maneuver of the ego vehicle based on traffic information in a target lane, selecting one or more cooperative vehicles to be involved in the maneuver in the target lane, determining whether the maneuver of the ego vehicle and actions of the one or more cooperative vehicles trigger congestion in the target lane based on simulation of the maneuver and the actions, instructing the ego vehicle to perform the maneuver in response to determining that the maneuver of the ego vehicle and actions of the one or more cooperative vehicles do not trigger congestion in the target lane, and adjusting a number of cooperative vehicles to be involved in the maneuver in the target lane in response to determining that the maneuver of the ego vehicle and actions of the one or more cooperative vehicles trigger congestion in the target lane.

According to the present disclosure, a cooperator selection system that can be a part of a connected automated vehicle, or an ego vehicle, takes in a representation of the driving environment around the ego vehicle that includes the states of the surrounding cars as well as the traffic density and flow, and determines the remote connected automated vehicles that the ego vehicle needs to cooperate with based on key performance indicators. The cooperator selection system provides better traffic flow, for example, uniform flow compared to congestion or stop-and-go traffic, driver comfort, and timeliness of the maneuver. Once the cooperating vehicles are determined, the cooperator selection system then selects specific trajectories for the determined cooperators, e.g., remote connected automated vehicles. Finally, the cooperator selection system sends this information to the appropriate vehicles. The present disclosure improves cooperative maneuvering by enabling systematic cooperation with multiple connected vehicles and systematic selection of these cooperative vehicles, which will result in better mobility, comfort and timeliness for these connected automated vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for determining a maneuver for an ego vehicle, the method comprising: determining a maneuver of the ego vehicle based on traffic information in a target lane; selecting one or more cooperative vehicles to be involved in the maneuver; determining whether the maneuver of the ego vehicle and actions of the one or more cooperative vehicles trigger congestion in the target lane based on simulation of the maneuver and the actions; instructing the ego vehicle to perform the maneuver in response to determining that the maneuver of the ego vehicle and actions of the one or more cooperative vehicles do not trigger congestion in the target lane; and adjusting a number of cooperative vehicles to be involved in the maneuver in response to determining that the maneuver of the ego vehicle and actions of the one or more cooperative vehicles trigger congestion in the target lane; wherein the number of selected one or more cooperative vehicles is determined based on a degree of traffic density in the target lane, the degree of traffic density in the target lane defining a first vehicle density at which a perturbation does not trigger the congestion such that the ego vehicle is cooperative with only one of the one or more cooperative vehicles, and a second vehicle density at which a perturbation triggers the congestion such that the ego vehicle is cooperative with more than one of the one or more cooperative vehicles.

2. The method of claim 1, further comprising:
predicting speed or acceleration profile oscillations of vehicles including the one or more cooperative vehicles involved in the maneuver of the ego vehicle; and
determining whether the maneuver of the ego vehicle and actions of the one or more cooperative vehicles trigger congestion in the target lane based on the speed or acceleration profile oscillations of the vehicles including the one or more cooperative vehicles.

3. The method of claim 2, further comprising:
obtaining car following models of the vehicles including the one or more cooperative vehicles; and
predicting speed or acceleration profile oscillations of the vehicles including the one or more cooperative vehicles based on the car following models.

4. The method of claim 1, further comprising:
increasing the number of cooperative vehicles to be involved in the maneuver in the target lane in response to determining that the maneuver of the ego vehicle and actions of the one or more cooperative vehicles trigger congestion in the target lane.

5. The method of claim 1, further comprising:
determining a minimum number of connected vehicles required to avoid triggering congestion in the target lane in response to determining that the maneuver of the ego vehicle and actions of the one or more cooperative vehicles do not trigger congestion in the target lane; and
reducing the number of cooperative vehicles to be involved in the maneuver to the minimum number of connected vehicles.

6. The method of claim 1, wherein the one or more cooperative vehicles are connected vehicles configured to communicate with the ego vehicle.

7. The method of claim 1, wherein the maneuver includes one of a lane change maneuver, a merging maneuver, a U-turn maneuver, and a left-turn or right-turn maneuver.

8. The method of claim 1, wherein the maneuver includes a trajectory of the ego vehicle.

9. The method of claim 1, further comprising:
transmitting, to the one or more cooperative vehicles, a maneuver message including information about the maneuver of the ego vehicle.

10. A method for determining a maneuver for an ego vehicle, the method comprising: determining a maneuver of the ego vehicle based on traffic information in a target lane; selecting a first cooperative vehicle to be involved in the maneuver; determining whether the maneuver of the ego vehicle and an action of the first cooperative vehicle trigger congestion in the target lane or whether the action of the first cooperative vehicle requires a level of deceleration greater than a threshold deceleration based on simulation of the maneuver and the action; instructing the ego vehicle to perform the maneuver in response to determining that the maneuver of the ego vehicle and the action of the first cooperative vehicle do not trigger congestion in the target lane or determining that the action of the first cooperative vehicle requires the level of deceleration less than the threshold deceleration; and selecting a second cooperative vehicle instead of the first cooperative vehicle to be involved in the maneuver in response to determining that the maneuver of the ego vehicle and action of the first cooperative vehicle trigger congestion in the target lane or determining that the action of the first cooperative vehicle requires the level of deceleration greater than the threshold deceleration; wherein the selected first cooperative vehicle is determined based on a degree of traffic density in the target lane, the degree of traffic density in the target lane defining a first vehicle density at which a perturbation does not trigger the congestion such that the ego vehicle is cooperative with only the first cooperative vehicle, and a second vehicle density at which a perturbation triggers the congestion such that the ego vehicle is cooperative with the second cooperative vehicle.

11. The method of claim 10, further comprising:
predicting speed or acceleration profile oscillations of vehicles including the first cooperative vehicle involved in the maneuver of the ego vehicle; and
determining whether the maneuver of the ego vehicle and actions of the first cooperative vehicle trigger congestion in the target lane or whether the action of the first cooperative vehicle requires the level of deceleration greater than the threshold deceleration based on the speed or acceleration profile oscillations of the vehicles including the first cooperative vehicle.

12. The method of claim 11, further comprising:
obtaining car following models of the vehicles including the first cooperative vehicle; and
predicting speed or acceleration profile oscillations of the vehicles including the first cooperative vehicle based on the car following models.

13. A system comprising: a processor programmed to: determine a maneuver of an ego vehicle based on traffic information in a target lane; select one or more cooperative vehicles to be involved in the maneuver; determine whether the maneuver of the ego vehicle and actions of the one or more cooperative vehicles trigger congestion in the target lane based on simulation of the maneuver and the actions; instruct the ego vehicle to perform the maneuver in response to determining that the maneuver of the ego vehicle and actions of the one or more cooperative vehicles do not trigger congestion in the target lane; and adjust a number of cooperative vehicles to be involved in the maneuver in response to determining that the maneuver of the ego vehicle and actions of the one or more cooperative vehicles trigger congestion in the target lane; wherein the number of selected one or more cooperative vehicles is determined based on a degree of traffic density in the target lane, the degree of traffic density in the target lane defining a first vehicle density at which a perturbation does not trigger the congestion such that the ego vehicle is cooperative with only one of the one or more cooperative vehicles, and a second vehicle density at which a perturbation triggers the congestion such that the ego vehicle is cooperative with more than one of the one or more cooperative vehicles.

14. The system of claim 13, wherein the processor is further programmed to:
predict speed or acceleration profile oscillations of vehicles including the one or more cooperative vehicles involved in the maneuver of the ego vehicle; and
determine whether the maneuver of the ego vehicle and actions of the one or more cooperative vehicles trigger congestion in the target lane based on the speed or acceleration profile oscillations of the vehicles including the one or more cooperative vehicles.

15. The system of claim 14, wherein the processor is further programmed to:
obtain car following models of the vehicles including the one or more cooperative vehicles; and
predict the speed or acceleration profile oscillations of the vehicles including the one or more cooperative vehicles based on the car following models.

16. The system of claim 13, wherein the processor is further programmed to:

increase the number of cooperative vehicles to be involved in the maneuver in the target lane in response to determining that the maneuver of the ego vehicle and actions of the one or more cooperative vehicles trigger congestion in the target lane.

17. The system of claim 13, wherein the processor is further programmed to:

determine a minimum number of connected vehicles required to avoid triggering congestion in the target lane in response to determining that the maneuver of the ego vehicle and actions of the one or more cooperative vehicles trigger congestion in the target lane; and reduce the number of cooperative vehicles to be involved in the maneuver to the minimum number of connected vehicles.

* * * * *